(12) United States Patent
Marzinke et al.

(10) Patent No.: US 6,177,583 B1
(45) Date of Patent: Jan. 23, 2001

(54) METHOD FOR THE PREPARATION OF AMINOPROPYL OR AMINOALKYL FUNCTIONAL POLYALKYL OR ARYL SILOXANES

(75) Inventors: Marla Marzinke, Ft. Washington; John H. MacMillan, Ambler; Thomas F. August, Glenolden; Michael J. Telepchak, Yardley, all of PA (US)

(73) Assignee: United Chemical Technologies, Inc., Bristol, PA (US)

( * ) Notice: Under 35 U.S.C. 154(b), the term of this patent shall be extended for 0 days.

(21) Appl. No.: 09/385,286

(22) Filed: Aug. 30, 1999

(51) Int. Cl.$^7$ ........................................ C02F 2/10
(52) U.S. Cl. ............................................ 556/425
(58) Field of Search .............................. 556/425

(56) References Cited

U.S. PATENT DOCUMENTS 3,775,452 * 11/1973 Karstedt ........................ 556/425
5,892,084 * 4/1999 Janeiro et al. .................. 556/425

* cited by examiner

*Primary Examiner*—Paul F. Shaver
(74) *Attorney, Agent, or Firm*—Kenneth Crimaldi; Robert A. Koons, Jr.; Pepper Hamilton LLP

(57) ABSTRACT

A new method for the preparation of aminopropyl terminated or internal functionalized polyalkyl or aryl siloxanes is described. The method involves readily available commercial starting materials and proceeds under mild conditions in high yield. Purification is facilitated over present commercial procedures and a wider variety of internal functionalized siloxanes may be prepared. The method involves hydrosilation of commercially availably alkyl or aryl functional hydrosilicones with allyl amine or other alkenyl or arenyl amine in the presence of platinum (0) divinyltetramethylsiloxane or platinum (0) cyclovinyl complexes.

5 Claims, No Drawings

METHOD FOR THE PREPARATION OF AMINOPROPYL OR AMINOALKYL FUNCTIONAL POLYALKYL OR ARYL SILOXANES

FIELD OF THE INVENTION

The present invention relates to methods for preparing amine functional silicone compounds. In particular, the invention relates to methods for preparing aminopropyl and aminoalkyl functional polyalkyl and polyaryl siloxanes, amine functional siloxanes. The invention provides a new method for hydrosilation of silicones for preparing these functional siloxanes using zero valent platinum catalysts.

BACKGROUND OF THE INVENTION

Amine functional silicones are of wide utility as releasing agents, surfactants, copolymers in urethane or epoxy composites, polycarbonates and polyamides. They also find utility in corrosion resistant coatings and polishes. Present commercial methods for manufacture of these materials suffer from several disadvantages.

One current commercial method involves preparation of aminopropyl terminated siloxanes, by reaction of a cyclic siloxane such as octamethylcyclotetrasiloxane with an endcapper such as bis(aminopropyltetramethylsiloxane) and a basic catalyst such as potassium hydroxide, carried out at 80–100° C. Disadvantages of this process include: first, the endcappers are not always readily available and require synthesis by reduction of cyano compounds by high pressure hydrogenations or pyrophoric metal hydrides. Second, the residual endcapper is high boiling and not readily removed from the polymer by simple distillation techniques. Third, the basic catalyst must be removed by extraction or thermal degradation to prevent side reactions in future processes.

For preparation of internally functionalized aminopropyl siloxane homopolymers or copolymers, a second process is used involving reaction of a cyclic siloxane such as octamethylcyclotetrasiloxane with an endcapper such as hexamethyldisiloxane, and a cyclic aminopropyl functional siloxane is carried out, with a basic catalyst at 80–100° C. This process has a number of disadvantages or shortcomings, which include the following. Disadvantages of this process include: first, the cyclic aminopropyl functional siloxanes are not commercially available and require synthesis by hydrolysis of aminopropyl dialkoxysilanes. Second, the residual cyclic aminopropyl functional siloxanes are high boiling and not readily removed from the polymer by simple distillation techniques. Third, the basic catalyst must be removed by extraction or thermal degradation to prevent side reactions in future processes.

We have discovered a new method for preparation of aminopropyl or aminoalkyl functional siloxanes that overcomes these disadvantages and shortcomings of previous methods.

Several disclosures made in United States Patents will now be discussed, illustrating the state of the art of siloxane chemistry.

U.S. Pat. No. 3,715,334 to Karstedt disclosed platinum-vinylsiloxane catalysts for hydrosilation reactions, where the catalysts were substantially free of chemically combined halogen. This disclosure did not teach or suggest the use of these catalysts for making aminofunctional compositions.

U.S. Pat. No. 3,775,452 to Karstedt disclosed platinum containing siloxane catalysts for hydrosilation reactions, and a method for making such catalysts. This Patent did not teach or suggest the use of these catalysts for making aminofunctional compositions.

U.S. Pat. No. 3,890,269 to Martin disclosed a method for preparing aminofunctional organopolysiloxanes, where the method comprised equilibrating an organopolysiloxane and an aminofuntional silane or siloxane in the presence of a catalyst. The catalysts that could beused in the method were disclosed as being bases such as alkali metal hydrides, e.g., sodium hydroxide, potassium hydride, lithium hydride, cerium hydride; alkali metal alkyls, e.g., ethyllithium, ethylsodium, butyllithium; alkali metal alkenyls, e.g., vinyllithium; alkali metal ayls, e.g., biphenylsodium, phenyllithium, potassium naphthalene, and lithium naphthalene. Alkali metal alkyls were preferred for use in the method. Platinum containing catalysts were neither taught, nor suggested for use in the method of U.S. Pat. No. 3,890,269.

U.S. Pat. No. 5,446,113 to Lewis disclosed a method for preparing heat curable organopolysilxane compositions by reacting a silicon hydride siloxane with a devolatilized mixture of a vinyl silicone fluid and a reaction product of a zero valent platinum complex and a vinylsilane. The use of this disclosed method for preparing aminofunctional siloxanes was neither taught, nor suggested in U.S. Pat. No. 5,446,113.

A need exists therefore for a method for preparing aminofunctional siloxanes that avoids the disadvantages and shortcomings of the methods described above. A need also exists for a one pot method of making aminofunctional siloxanes, the method being easy and rapid to conduct. Still another need exists for a one pot method of making aminofunctional siloxanes using a neutral catalyst, thereby avoiding interference with further reactions of the amino group.

To overcome the shortcomings of known methods above, and to satisfy the outstanding needs outlined above we have now discovered a new method for preparing aminofunctional siloxanes.

SUMMARY OR THE INVENTION

Briefly, the invention is a new method for preparing aminofunctional siloxanes by a hydrosilation reaction using zero valent platinum catalysts.

The applicants' invention consists of hydrosilation reaction of commercially available alkyl or aryl hydrosilicones with allyl amine or other alkenyl or arenyl amine in the presence of a platinum (0) divinyltetramethylsiloxane or a platinum (0) cyclovinyl complex. Prior literature suggests that the amino functionality prevents hydrosilation reactions utilizing platinum catalysts such a chloroplatinic acid, or palladium and rhodium catalysts, from occurring due to poisoning or inhibition. In contrast, the present invention discloses the active platinum (0) divinyltetramethylsiloxane complexes such as PC072, a platinum (0) divinyltetramethylsiloxane complex in xylene; and platinum (0) cyclovinyl complexes such as PC085, a platinum (0) cyclovinyl complex in cyclic vinyl siloxane, both available from United Chemical Technologies, Inc., Bristol, Pennsylvania, as allowing facile and quantitative hydrosilations of hydrosilicones at moderate temperatures with allyl amine or other alkenyl or arenyl amines to yield aminopropyl or aminoakylsilicones with no detectable residual SiH functionality. Reactions proceed smoothly at from about 60° C. to about 100° C. over several hours.

Advantages of this process over the prior art discussed above include:

1) Allyl amine is a cheap and readily available commercial product in contrast to the endcappers and cyclic amino siloxanes necessary in the prior art. Likewise, alkyl or aryl hydrosilicones are readily available with a wide range of molecular weights, allowing synthesis of a wide variety of aminopropyl or amino alkyl silicones.

2) Allyl amine is low boiling (55–58° C.) and excess is readily removable from the reaction by simple reduced pressure distillation techniques. The easy removal of this starting material allows addition of large stoichiometric excesses to drive the hydrosilation reactions to completion.

3) The residual platinum catalyst is neutral and will not interfere with further reactions typical of the amino group. By contrast, prior art requires removal of the basic catalyst by tedious extraction or thermal degradation techniques to prevent side reactions or added catalytic activity. If desired, residual platinum may be easily removed by stirring the polymer with C-18 endcapped silica such as that provided by United Chemical Technologies, Inc., or passing the polymer through a column of said silica.

4) The process allows facile partial aminopropyl functionalization of alkylhydrosiloxy homopolymers or copolymers with silicon hydride in the backbone. Remaining unreacted hydride may then be further functionalized with alkyl or other groups utilizing alkenes or functionalized alkenes and standard hydrosilation techniques. Prior art requires copolymerization of cyclic hydrosilicones with difficulty synthesized cyclic amino alkyl functionalized siloxanes and acid or base catalyst. The catalyst must be removed by extraction, filtration or thermal degradation prior to further hydrosilation, or else side reactions with platinum catalyst may occur.

DETAILED DESCRIPTION OF THE INVENTION

We have developed a new and improved hydrosilation method, well suited for use in preparing aminofunctional siloxanes. The method will be understood more clearly by reference to the accompanying examples below.

An alkyl or an aryl functional hydrosilicone, where the alkyl group is methyl or alkyl from C2 to C30, or where the aryl group is phenyl or naphthyl; and an alkenyl amine, where the alkenyl group is C3 (allyl) or C4 to C30 are contacted, or mixed together, in a first step. The resulting mixture is then heated at a temperature of from about 60° C. to about 100° C., and for a period of time from about 2 to about 8 hours, in a second equilibration step. These steps result in an aminofunctional siloxane product. This desired product has negligible remaining hydride content.

The amines that may be used in the method of the invention may be primary amines, N,N-dimethylamine, or other alkyl functional amines of chain length C2 to C30.

Preferably, the heating is carried out at a temperature of from about 60° C. to about 100° C., and for a period of time from about 2 to about 8 hours. Those skilled in the art will readily be able to conduct such an equilibration within the teachings of the invention without undue experimentation. More preferably, the heating is carried out at a temperature of from about 60° C. to about 80° C., and for a period of time from about 2 to about 8 hours. The period of time for the heating can be selected as one being sufficiently long to allow the desired product to form completely.

It has been discovered that the subject reactions are readily catalyzed by zero valent platinum catalysts such as the active platinum (0) divinyltetramethylsiloxane complex, sold as catalog number PC072; or the platinum (0) cyclovinyl complex, sold as catalog number PC085; both complexes being available commercially from United Chemical Technologies, Inc., Bristol, Penn., USA. The PC072 catalyst is available in xylene, as a carrier, and contains approximately 2 to 3 percent platinum. The PC085 catalyst is available in a cyclic silicone carrier and also contains about 2 to 3 percent platinum. It is preferred that the inventive method disclosed here be carried out with the catalyst present at from about 5 to about 100 parts per million in the reaction mixture. A solvent may be used in the present inventive method, for dissolving the alkyl or aryl hydrosilicone, and the alkenyl or arenyl amine being used in the method. Preferred solvents include dioxane, alkyl ethers, diethylene glycol, diethoxyethane, tetrahydrofuran, toluene, and xylene. Especially preferred as a solvent are toluene and xylene.

"Alkyl" here is intended to include linear, branched, or cyclic hydrocarbon chain structures and combinations thereof. "Lower alkyl" is intended to include alkyl groups of from 1 to 8 carbon atoms. Examples of lower alkyl groups include methyl, ethyl, propyl, isopropyl, butyl, s- and t-butyl, pentyl, hexyl, octyl, cyclopropylethyl, and the like. "Lower cycloalkyl" is intended to include cycloalkyl groups of from 3 to 8 carbon atoms. Examples of lower cycloalkyl groups include c-propyl, c-butyl, c-pentyl, 2-methylcyclopropyl, norbornyl, and the like . "Alkenyl" here is intended to include linear, branched, or cyclic (C5 or C6) carbon chains or combinations thereof. Examples of alkenyl groups include, by way of illustration, vinyl, allyl, isopropenyl, pentenyl, hexenyl, c-hexenyl, 1-propenyl, 2-butenyl, 2-methyl-2-butenyl, and the like. "Aryl" is intended to include radicals such as phenyl, tolyl, napthyl, and the like.

A type of reaction that can be carried out in accordance with the teachings of the invention is the reaction illustrated in the scheme below.

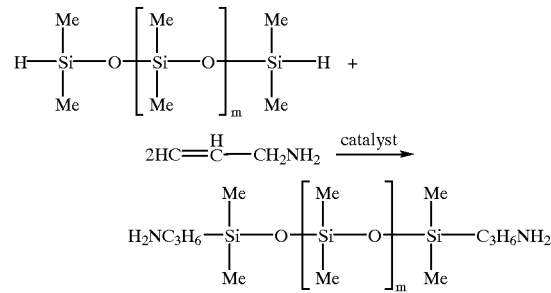

In this scheme, a polydimethylsiloxane, hydride terminated, is reacted with allylamine in the presence of a catalyst such as the zero valent platinum catalysts described herein. The value of m can vary from zero to 6,000. In this particular scheme, a homopolymer was used as a starting material to illustrate a method according to the invention. A copolymer can also be used as a starting material in the inventive method, without deviating from the teachings of the invention.

A scheme illustrating the structure of a copolymer that could be used according to the teachings of the present invention is shown below.

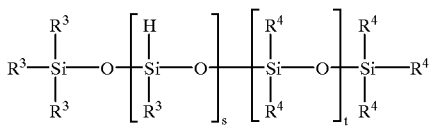

In this structure, $R^3$ and $R^4$ may be the same or different, and are selected from the group consisting of alkyl from C2 to C30, phenyl and naphthyl. The values of s and t may be the same or different, and s and t have values from zero to 6,000. The method of the invention is carried out by contacting the polymer with a functional amine selected from the group consisting of alkenyl amines from C3 to C30; and a platinum (0) complex selected from the group consisting of platinum (0) divinyltetramethylsiloxane, and platinum (0) tetravinyltetramethylcyclotetrasiloxane. A second step of the method according to the invention is heating the contacted starting materials at from about 60° C. to about 80° C. for a period of time sufficient to form a desired amino functional silicone polymer.

The method according to the invention may also be applied to a silicone polymer starting material having the structure:

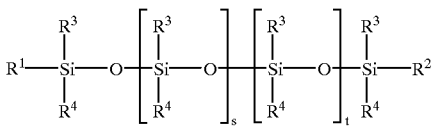

$R^1$, $R^2$, $R^3$, and $R^4$ are the same or different, and $R^1$, $R^2$, $R^3$, and $R^4$ are selected independently from the group consisting of hydride, alkyl from C-2 to C-30, phenyl and naphthyl, s is from 0 to 6,000, and t is from 0 to 6,000.

The method of the invention will be more clearly understood by those skilled in the art by reference to specific examples provided below. These examples, while illustrating several ways in which the method according to the invention may be practiced, are not to be taken as limiting the practice of the invention.

EXAMPLE 1

About 11.8 parts of allylamine was added drop wise through an addition funnel to a stirred reaction vessel containing 2830 parts of polydimethylsiloxane, hydride terminated, and approximately 5–50 parts per million of platinum (0) divinyltetramethylsiloxane (PC072 from United Chemical Technologies, Inc.), at a reaction vessel temperature of 65° C. A reaction was evidenced by an increase in temperature and bubbling. After the addition was complete, the reaction vessel was heated at 75° C. for 3 hours. The polydimethylsiloxane, hydride terminated, had a viscosity of 1765.3 centistokes, an amine content of 0.075 meq/g (milliequivalents per gram). After the reaction, the product had a viscosity of 1876.5 centistokes, an amine content of 0.065 meq/g, and a negligible amount of hydride.

EXAMPLE 2

The procedure of example 1 was repeated using 7 parts of allylamine and 1000 parts of polydimethylsiloxane, hydride terminated. The polydimethylsiloxane, hydride terminated, had a viscosity of 763.81 centistokes, and a hydride content of 0.106 meq/g. After the reaction, the product had a viscosity of 829.6 centistokes, an amine content of 0.0991 meq/g, and a negligible amount of hydride.

EXAMPLE 3

The procedure of example 1 was repeated using 87 parts of allylamine and 2700 parts of polydimethylsiloxane, hydride terminated. The polydimethylsiloxane, hydride terminated, had a viscosity of 41.73 centistokes and a hydride content of 0.567 meq/g. After the reaction the product had a viscosity of 49.22 centistokes, an amine content of 0.522 meq/g, and no hydride content.

EXAMPLE 4

The procedure of example 1 was repeated using 48 parts of allylamine and 1000 parts of polydimethylsiloxane, hydride terminated. The polydimethylsiloxane, hydride terminated, had a viscosity of 2.43 centistokes and a hydride content 3.24 meq/g. After the reaction the product had a viscosity of 8 centistokes, an amine content of 3.02 meq/g, and no hydride content.

EXAMPLE 5

The procedure of example 1 was repeated using 84 parts of allylamine and 2500 parts of polydimethylsiloxane, hydride terminated. The polydimethylsiloxane, hydride terminated, had a viscosity of 14.5 centistokes and a hydride content of 0.590 meq/g. After the reaction the product had a viscosity of 17.83 centistokes, an amine content of 0.479 meq/g, and a negligible amount of hydride.

EXAMPLE 6

The procedure of example 1 was repeated using 40 parts of allylamine and 2000 parts of polydimethylsiloxane, hydride terminated. The polydimethylsiloxane, hydride terminated, had a viscosity of 111.5 centistokes and a hydride content of 0.360 meq/g. After the reaction the product had a viscosity of 126.97 centistokes, an amine content of 0.350 meq/g, and no hydride content.

The present invention is not to be limited in scope by the examples disclosed herein, which are intended as single illustrations of one aspect of the invention, and any which are functionally equivalent are within the scope of the invention. Indeed, various modifications of the invention, in addition to those shown and described herein, will become apparent to those skilled in the art from the foregoing description. Such modifications are intended to fall within the scope of the appended claims. All patents and any publications mentioned herein are hereby incorporated by reference.

We claim:

1. A method for preparing an amino functional silicone polymer, comprising:

a) contacting a silicone polymer having the structure

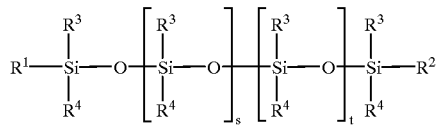

where $R^1$, $R^2$, $R^3$, and $R^4$ are the same or different, and $R^1$, $R^2$, $R^3$ and $R^4$ are selected from the group consisting of hydride, alkyl from C-2 to C-30, phenyl and naphthyl, s is from 0 to 6,000, and t is from 0 to 6,000 ;

a functional amine selected from the group consisting of alkenyl amines from C-3 to C-30; and a platinum (0) complex selected from the group consisting of platinum (0) divinyltetramethylsiloxane, and platinum (0) tetravinyltetramethylcyclotetrasiloxane; and b) heating at from about 60° C. to about 80° C. for a period of time sufficient to form the amino functional silicone polymer.

2. The method according to claim 1, wherein the heating is for a period of from about 2 to about 8 hours.

3. The method according to claim 1, wherein $R^1$ and $R^2$ are hydride.

4. The method according to claim 2, wherein $R^3$, and $R^4$ are phenyl.

5. A method for preparing an amino functional silicone polymer, comprising:

a) contacting a polydimethylsiloxane, hydride terminated, silicone polymer having the structure

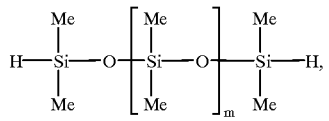

where m is from zero to about 6,000; with
a functional amine selected from the group consisting of alkenyl amines from C-3 to C-30; and
a platinum (0) complex selected from the group consisting of platinum (0) divinyltetramethylsiloxane, and platinum (0) tetravinyltetramethylcyclotetrasiloxane; and b) heating at from about 60° C. to about 80° C. for a period of time sufficient to form the amino functional silicone polymer.

* * * * *